US012568973B1

(12) United States Patent
Paxton, IV et al.

(10) Patent No.: US 12,568,973 B1
(45) Date of Patent: Mar. 10, 2026

(54) DIAMOND-BASED BIOCIDAL SURFACE

(71) Applicants: William Francis Paxton, IV, Louisville, KY (US); Morgan Madison Brooks, Austin, TX (US); Muhammad Zain Akram, Louisville, KY (US); Keith Stull Lunkenheimer, Wayne, PA (US)

(72) Inventors: William Francis Paxton, IV, Louisville, KY (US); Morgan Madison Brooks, Austin, TX (US); Muhammad Zain Akram, Louisville, KY (US); Keith Stull Lunkenheimer, Wayne, PA (US)

( * ) Notice: Subject to any disclaimer, the term of this patent is extended or adjusted under 35 U.S.C. 154(b) by 465 days.

(21) Appl. No.: 17/319,968

(22) Filed: May 13, 2021

Related U.S. Application Data

(60) Provisional application No. 63/121,055, filed on Dec. 3, 2020, provisional application No. 63/024,711, filed on May 14, 2020.

(51) Int. Cl.
 *A01N 59/00* (2006.01)
 *A01N 25/10* (2006.01)

(52) U.S. Cl.
 CPC ............. *A01N 59/00* (2013.01); *A01N 25/10* (2013.01)

(58) Field of Classification Search
 CPC ................................ A01N 59/00; A01N 25/10
 See application file for complete search history.

(56) References Cited

U.S. PATENT DOCUMENTS

| | | | |
|---|---|---|---|
| 9,649,338 B2 | 5/2017 | Ostrum et al. | |
| 2009/0187155 A1 | 7/2009 | Razavi | |
| 2013/0344123 A1 | 12/2013 | Ostrum et al. | |
| 2016/0138150 A1 | 5/2016 | Pershin et al. | |
| 2016/0212989 A1* | 7/2016 | Juodkazis | C12Q 1/24 |
| 2020/0288707 A1 | 9/2020 | Juodkazis et al. | |

OTHER PUBLICATIONS

C. Adlhart, "Surface modifications for antimicrobial effects in the healthcare setting: a critical overview," Journal of Hospital Infection 99 (2018) 239-249.*

E. T. Santiao et al., "Applications of Nanodiamonds in the Detection and Therapy of Infectious Diseases," Materials 2019, 12, 1639, p. 1-10.*

S. Szunerits et al., "Antibacteria lApplications of Nanodiamonds, Internationa lJournal of Environmental Research and Public Health," 2016, 13, 413, p. 1-15.*

S. Micin et al., "Morphological and Crystallographic Characteristics of Electrochemically Deposited Ternary Alloy Zinc-Nickel-Cobalt," Journal of Chemical Technology and Metallurgy, 51, 5, 2016, 556-562.*

J. Jenkins et al., "Antibacterial effects of nanopillar surfaces are mediated by cell impedance, penetration and induction of oxidative stress," Nature Communications, 11:1626, <https://www.nature.com/articles/s41467-020-15471-x?fromPaywallRec=false>, published Apr. 2, 2020, p. 1-14.*

A. Zolotukhin et al., "Thermal oxidation of CVD diamond," Diamond & Related Materials 19 (2010) 1007-1011.*

Beranova et al., Antibacterial behavior of diamond nanoparticles against *Escherichia coli*, Phys. Status Solidi 2012, pp. 2581-2584, v 249.

May et al., Diamond-coated 'black silicon' as a promising material for high-surface-area electrochemical electrodes and antibacterial surfaces, J. Mater. Chem. B., 2016, pp. 5737-5746, v 4.

Medina et al., Bactericide and baterial anti-adhesive properties of the nanocrystalline diamond surface, Diamond & Related Materials 2012, pp. 77-81, v 22.

Oh et al., Antibacterial mechanisms of nanocrystalline diamond film and graphene sheet, Res in Physics, 2019, pp. 2129-2135, v 12.

Goriainov, V. et al. Harnessing nanotopography to enhance osseointegration of clinical orthopedic titanium implants—an in vitro and in vivo analysis. Front. Bioeng. Biotechnol. 2018. 6, 1-14.

Sjostrom, T., Nobbs, A. H. & Su, B. Bactericidal nanospike surfaces via thermal oxidation of Ti alloy substrates. Mater. Lett. 2016. 167, 22-26.

* cited by examiner

*Primary Examiner* — Monica A Shin
(74) *Attorney, Agent, or Firm* — Barnes & Thornburg LLP

(57) ABSTRACT

The present development is an antimicrobial surface nanostructured carbon-based coating for a substrate, a process for making the antimicrobial surface coating, and a method for using the coating to inhibit pathogen growth on the substrate surface. The carbon-based coating material comprises pure carbon deposited on the substrate as a plurality of elongated nanostructures wherein each nanostructure has a high aspect ratio. The high aspect ratio creates needle-like nanostructures on the surface that exhibit antimicrobial properties. In an exemplary embodiment, the carbon-based coating is a diamond coating wherein the elongated nanostructures have a needle-like morphology and each needle has a height of <5 µm and an extremely sharp radius of curvature at the tip.

19 Claims, 2 Drawing Sheets

DIAMOND-BASED BIOCIDAL SURFACE

CROSS-REFERENCE TO PRIOR APPLICATIONS

The present application claims priority to U.S. Patent Application 63/024,711 filed 2020 May 14, and 63/121,055 filed 2020 Dec. 3, both of which are incorporated by reference in their entireties.

GOVERNMENT INTEREST

This invention was made without government support.

FIELD OF THE INVENTION

The invention relates to a method of inhibiting bacterial, viral and fungal growth using nanostructured carbon-based coatings.

BACKGROUND OF THE INVENTION

The spread of infectious diseases through contact with microbial contaminated surfaces is a universal problem. Certain surfaces such as a pure copper exhibit inherent antimicrobial properties but typically lose their efficacy over long periods of time as the copper undergoes oxidation through contact with air or with bacteria. Other surfaces such as steel and plastic offer little biocidal properties and must be frequently cleaned with a disinfectant to prevent the buildup of biological contaminants.

Polymer-based coatings have garnered recent interest as a means to bestow antimicrobial properties onto certain surfaces. N-halamine polymer-based coatings have demonstrated strong antimicrobial properties across a broad spectrum of microorganisms. Unfortunately, they have demonstrated limited stability and often require reactivation after certain periods of time through exposure to bleach.

Recent research has found engineered substrates with certain chemical compositions, surface energy, hydrophobicity, and topography can both dramatically promote and inhibit the cellular processes necessary to sustain viability of infectious diseases. Specifically, it has been shown that materials with high aspect ratios can generate a mechanical bactericidal effect which is independent of chemical composition. An example of a high aspect ratio material is known as "Black Silicon", a material originally designed to improve the efficiency of silicon-based solar cells. This surface consists of an array of regularly spaced nanopillars etched into a silicon substrate by means of reactive ion etching. While effective for producing a bactericidal effect, there is a low probability that the Black Silicon approach will find broad commercial application because it requires a starting substrate of silicon, it utilizes expensive microfabrication techniques, and it cannot be readily transferred to other surfaces.

Thus, it would be beneficial to identify a bactericidal surface coating that is easy to produce, non-toxic, long lasting, stable, cost efficient and capable of being deposited onto a wide variety of surface materials.

SUMMARY OF THE PRESENT INVENTION

Figure 1:
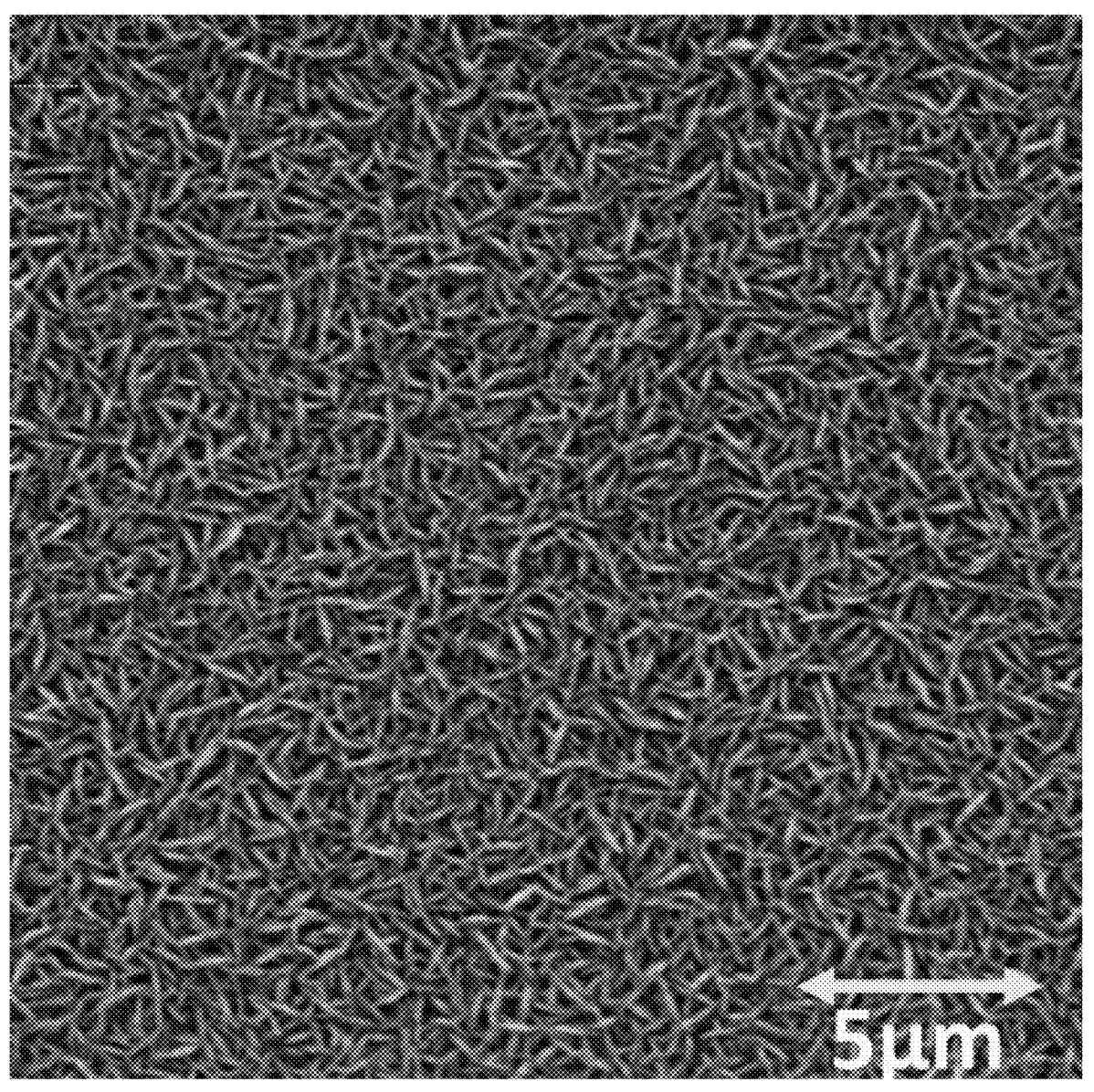
FIG. 1 is a scanning electron micrograph magnified at 10 kx magnification of a diamond nanoneedle coating deposited on a silicon substrate using microwave plasma chemical vapor deposition; and, FIG. 2 is a set of photographs of pathogen growth on agar plates following collection from untreated and treated surfaces at t=0 hrs, t=48 hrs and t=96 hrs.

The present development is an antimicrobial surface nanostructured carbon-based coating for a substrate, a process for making the antimicrobial surface coating, and a method for using the coating to inhibit pathogen growth on the substrate surface. The carbon-based coating material comprises carbon deposited on the substrate as a plurality of elongated nanostructures wherein each nanostructure has a high aspect ratio. The high aspect ratio creates needle-like nanostructures on the surface that exhibit antimicrobial properties. In an exemplary embodiment, the carbon-based coating is a diamond coating wherein the elongated nanostructures have a needle-like morphology and each needle has a height of <5 μm and an extremely sharp radius of curvature at the tip.

DETAILED DESCRIPTION OF THE PRESENT DEVELOPMENT

The following description is intended to provide the reader with a better understanding of the invention. The description is not intended to be limiting with respect to any element not otherwise limited within the claims.

The present development is an antimicrobial surface nanostructured carbon-based coating for a substrate, a process for making the antimicrobial surface coating, and a method for using the coating to inhibit pathogen growth on the substrate surface.

The nanostructured carbon-based coating comprises a plurality of essentially pure carbon high aspect ratio nanostructures wherein each nanostructure defines a base and a tip, and wherein each nanostructure has an extremely sharp radius of curvature at the tip. The high aspect ratio nanostructures may be referred to herein interchangeably as nanostructures or carbon nanostructures or needles or carbon needles or pillars or carbon pillars. As used herein, the term "high aspect ratio nanostructure" means a nanostructure that defines a length (also referred to herein as the height) and a width and wherein the length is several times greater than the width. In a preferred embodiment as applied to the present invention, the length is between 5 times and 100 times the nanostructure's width. As used herein, "extremely sharp radius of curvature" means a radius of curvature less than about 100 nm.

In a preferred embodiment, the needle height of the carbon-based coating ranges from about 10 nm to about 25 μm. In a more preferred embodiment, the needle height ranges from about 50 nm to about 5 μm. The needles preferably have a conical shape, with a relatively broad base and an opposing narrow point. In a preferred embodiment, the carbon is in the form of carbon allotropes, SP3 (diamond), SP2 (graphite) or a combination thereof. The carbon coating is carried on the substrate. The substrate can be any material that can accept and allow the carbon coating to adhere to the substrate.

The antimicrobial surface nanostructured carbon-based coating is prepared by (1) providing a carbon source; (2) providing a substrate; (3) depositing the carbon source on the substrate; and (4) collecting the coated substrate. An advantage of the present development is that minimal post-processing is required. For example, the coating is effective as deposited on the substrate without the need for reactive ion etching or other microfabrication processing. This aspect differs significantly from the prior art which teaches the use microfabrication processes to produce high aspect ratio diamond structures, such as micro-processing of a silicon substrate to create pillars ranging from 1 μm to about 20 μm in height.

The carbon source can be any material that is known in the art for deposition of diamond needles or that is known as a source for deposition of SP3 allotropes or SP2 allotropes of carbon. In a preferred embodiment, the carbon source is a pure carbon material or a hydrocarbon material. Optionally, the carbon source may comprise oxygen, but it is recommended that the oxygen content be limited to maximize the pure carbon nanostructure production. Representative sources of carbon include, but are not limited to, methane, ethane, propane, ethylene, propylene, acetylene, methylacetylene, methanol, acetone, graphite, solid carbon, and combinations thereof.

The carbon-based coating material can be deposited on a variety of substrates. The substrate needs to accept and allow the coating to adhere to the substrate. The most effective substrates are materials that readily form a carbide upon exposure to carbon-based materials. Optionally, for substrates unable to readily form a carbide upon exposure to carbon-based materials, an interface layer suitable for carbon/diamond growth may be applied to substrate before carbon deposition. Exemplary substrates include metals, plastics, ceramics, glass, carbon-based materials, semiconductors, steel, stainless steel, galvanized steel, iron, aluminum, copper, polyethylene, polypropylene, polycarbonate, acrylic sheet, silicon, molybdenum, tungsten, borosilicate, quartz, and combinations thereof. If an interface layer is needed, suitable interface layers are generally known in the art and include chromium, silicon, silicon-based materials, nitrides, chromium nitride, aluminum nitride, tungsten-based materials, molybdenum-based materials, tungsten alloys, molybdenum alloys, and combinations thereof.

The coating material must be deposited on the substrate in such a way that greater than about 30% of the nanostructures are oriented with the base of the nanostructure abutting or adhering to the substrate. The needles may be randomly oriented or aligned in a single direction. FIG. 1 is a scanning electron micrograph image of a diamond needle surface magnified at 10 kx magnification. As indicated by the SEM image, over a 5 μm linear area there are a plurality of needle points exposed.

The surface coating material can be deposited on the substrate using a variety of methods known in the art, including but not limited to vapor deposition methods, physical deposition methods, adhesive bonding methods, or combinations thereof. In a preferred embodiment, the surface coating material is deposited on the substrate using microwave-plasma-enhanced chemical vapor deposition (MPCVD), hot-filament chemical vapor deposition (HFCVD), flame torch pyrolysis, or by physical deposition, such as doctor blading, or by use of adhesives. The surface coating material can be deposited on the substrate using a variety of energy sources known in the art. In a preferred embodiment, the energy source is selected from microwaves, heated filaments, high voltage electrodes, a means for producing a plasma or arc, a heat source, and combinations thereof. Specific reaction conditions vary based on selected coating material, deposition method, and substrate. In a preferred embodiment, the surface coating material is applied to deliver from about 0.1 mg/cm² to about 0.5 mg/cm².

The following example is presented to further demonstrate the present invention and is not intended to otherwise limit the scope of the claims. In an exemplary embodiment, a carbon-based coating is deposited on a galvanized steel substrate that has a chromium coating of about 1 nm to about 10 nm using microwave plasma chemical vapor deposition (MPCVD) according to the following procedure: A chromium coated galvanized steel substrate is positioned in a reaction chamber and heated to a temperature of from about 750° C. to about 900° C. A gas mixture of about 70%-90% hydrogen and 5%-15% methane and 5%-15% nitrogen is introduced into the reaction chamber directed to flow toward the steel substrate. The gas mixture total flow rate is about 200-500 standard cubic centimeters per minute and the chamber pressure is maintained at about 20-60 Torr. The gas mixture is subjected to a microwave source to deposit carbon needles, in the form of diamond, on the substrate. When the desired needle thickness has been deposited, the microwave source is terminated, excess reactants are removed from the reaction chamber using a vacuum pump via a pressure control system, and the coated substrate is allowed to cool to ambient temperature and is removed from the reaction chamber.

The antimicrobial surface nanostructured carbon-based coating of the present development is useful for inhibiting pathogen growth on the substrate surface or for producing an antimicrobial surface on the substrate. As used herein, "pathogen" refers to any bacterium, virus or fungus, either individually or collectively. Without being bound by theory, it is believed that the carbon-based nanostructures, and specifically the SP3/SP2 carbon allotropes, produce a surface contour that can mechanically disrupt, puncture, or penetrate a cell wall of a pathogen if present, or that can otherwise mechanically disrupt or puncture or penetrate the pathogen to negatively affect its normal activity. When the cell wall is disrupted cellular activity is interrupted thereby limiting the normal reproductive activities of the pathogen. Alternatively or in addition to other disruptive processes, the viability time of the pathogen may be decreased thereby limiting spread to other organisms. Further, it is believed that the carbon allotropes create a confined space preventing replication or spreading or proliferation of the pathogens. It is also postulated that the hydrophobicity of the diamond limits pathogen adhesion. The result is a highly effective antimicrobial surface which not only prevents/limits the spread of pathogens but also has the ability to destroy them upon contact with the surface.

Figure 2:
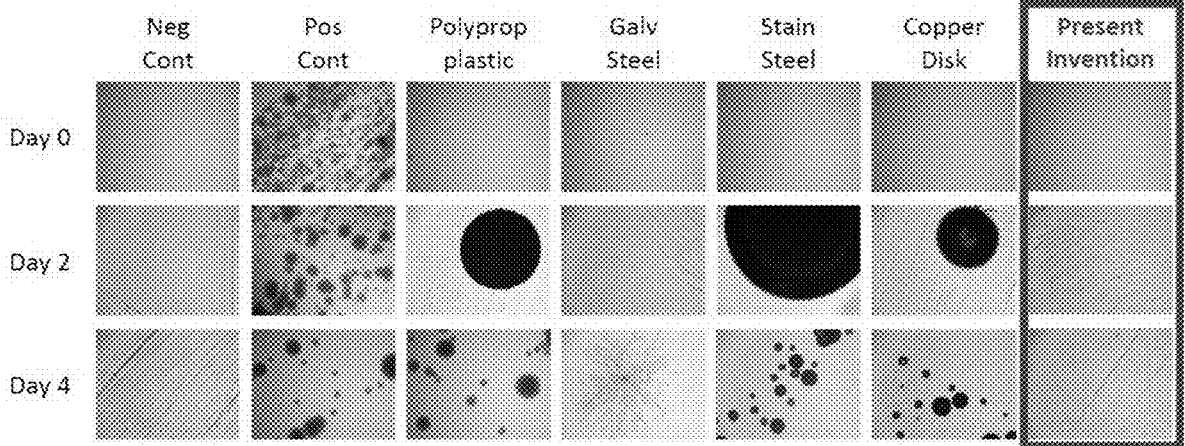

The efficacy of the diamond needle coating was evaluated using human nasal and skin pathogens. The pathogens were evenly distributed on a cotton swab (positive control), a piece of polypropylene plastic, a piece of galvanized steel, a piece of stainless steel, a piece of copper disk, and a piece of silicon treated with the diamond needle coating approximately ten years prior to pathogen exposure testing. A cotton swab treated with saline solution but untreated with the pathogens was smeared on a Lysogeny broth agar plate served as a negative control. All test samples were stored at a temperature of from about 21° C. to about 24° C. at atmospheric pressure. Specimens were collected a t=0 min, t=48 hrs, and t=96 hrs from each surface using a sterile cotton swab dampened with saline solution. Each specimen was deposited on a Lysogeny broth agar plate and incubated at a temperature of from about 21° C. to about 24° C. at atmospheric pressure for five days. As shown in FIG. 2, after the 96 hr growth period, the diamond needle coated silicon exhibited surface contamination similar to the negative control. Similar results were obtained after a 28-day pathogen exposure period.

As demonstrated herein, the bacterial, viral and fungal growth can be inhibited using a substrate coating comprising carbon needles, wherein each needle has an extremely sharp radius of curvature at the tip.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. An antimicrobial material comprising a nanostructured carbon-based coating on a substrate,
   wherein the coating comprises a plurality of diamond nanostructures, or graphite nanostructures, or diamond and graphite nanostructures, each nanostructure having a height and a width, wherein the height is from about 10 nm to about 25 m, and wherein the height is between 5 times and 100 times the width,
   wherein each nanostructure defines a base and a tip, wherein the base is broader than the tip, and wherein each tip has a radius of curvature of less than about 100 nm, and
   wherein each nanostructure is randomly oriented on the substrate, wherein at least about 30% of the nanostructures are oriented with the base adhered to the substrate.

2. The antimicrobial material of claim 1 wherein each nanostructure has a height of from 50 nm to 5 μm.

3. The antimicrobial material of claim 1 wherein the carbon-based coating is prepared from a carbon source comprising a pure carbon material or a hydrocarbon material or a carbon-hydrogen-oxygen material.

4. The antimicrobial material of claim 3 wherein the carbon source is methane, ethane, propane, ethylene, propylene, acetylene, methylacetylene, methanol, acetone, graphite, solid carbon, and combinations thereof.

5. The antimicrobial material of claim 4 wherein the carbon source is deposited on the substrate by vapor deposition, physical deposition, adhesive bonding, chemical vapor deposition, microwave-plasma-enhanced chemical vapor deposition, hot-filament chemical vapor deposition, flame torch pyrolysis, doctor blading, or a combination thereof, and wherein no microfabrication processing of the deposited carbon source is required to achieve the biocidal properties.

6. The antimicrobial material of claim 1 wherein the substrate is selected from metals, plastics, ceramics, glass, carbon-based materials, semiconductors, steel, stainless steel, galvanized steel, iron, aluminum, copper, polyethylene, polypropylene, polycarbonate, acrylic sheet, textiles, silicon, molybdenum, tungsten, borosilicate, quartz, and combinations thereof.

7. The antimicrobial material of claim 1 wherein the substrate is a material that forms a carbide upon exposure to carbon-based materials.

8. The antimicrobial material of claim 1, wherein about 30% to 95% of the nanostructures are oriented with the base adhered to the substrate.

9. The antimicrobial material of claim 1, wherein each nanostructure has a conical shape.

10. An antimicrobial material consisting essentially of a nanostructured carbon-based coating on a substrate,
   wherein the coating comprises a plurality of diamond nanostructures, or graphite nanostructures, or diamond and graphite nanostructures, each nanostructure having a height and a width, wherein the height is from about 10 nm to about 25 m, and wherein the height is between 5 times and 100 times the width,
   wherein each nanostructure defines a base and a tip, wherein the base is broader than the tip, and wherein each tip has a radius of curvature of less than about 100 nm, and
   wherein each nanostructure is randomly oriented on the substrate, wherein at least about 30% of the nanostructures are oriented with the base adhered to the substrate.

11. An antimicrobial material comprising a nanostructured carbon-based coating on a substrate,
   wherein the coating comprises a plurality of diamond nanostructures, or graphite nanostructures, or diamond and graphite nanostructures, wherein each nanostructure has a height of from about 10 nm to about 25 μm,
   wherein each nanostructure defines a base and a tip, wherein the base is broader than the tip, and wherein each tip has a radius of curvature of less than about 100 nm, and
   wherein each nanostructure is randomly oriented on the substrate, wherein at least about 30% of the nanostructures are oriented with the base adhered to the substrate, and
   wherein the coating is deposited on the substrate by vapor deposition, physical deposition, adhesive bonding, chemical vapor deposition, microwave-plasma-enhanced chemical vapor deposition, hot-filament chemical vapor deposition, flame torch pyrolysis, doctor blading, or a combination thereof, and wherein there is no microfabrication processing of the deposited coating.

12. The antimicrobial material of claim 11 wherein each nanostructure has a height and a width, and wherein the height is between 5 times and 100 times the nanostructure's width.

13. The antimicrobial material of claim 11 wherein each nanostructure has a height of from 50 nm to 5 µm.

14. The antimicrobial material of claim 11 wherein the carbon-based coating is prepared from a carbon source comprising a pure carbon material or a hydrocarbon material or a carbon-hydrogen-oxygen material.

15. The antimicrobial material of claim 14 wherein the carbon source is methane, ethane, propane, ethylene, propylene, acetylene, methylacetylene, methanol, acetone, graphite, solid carbon, and combinations thereof.

16. The antimicrobial material of claim 11 wherein the substrate is selected from metals, plastics, ceramics, glass, carbon-based materials, semiconductors, steel, stainless steel, galvanized steel, iron, aluminum, copper, polyethylene, polypropylene, polycarbonate, acrylic sheet, textiles, silicon, molybdenum, tungsten, borosilicate, quartz, and combinations thereof.

17. The antimicrobial material of claim 11 wherein the substrate is a material that forms a carbide upon exposure to carbon-based materials.

18. The antimicrobial material of claim 11, wherein about 30% to 95% of the nanostructures are oriented with the base adhered to the substrate.

19. The antimicrobial material of claim 11, wherein each nanostructure has a conical shape.

\* \* \* \* \*